Oct. 18, 1927.
J. SLEPIAN
1,645,937
TRANSMISSION SYSTEM
Filed March 17, 1924
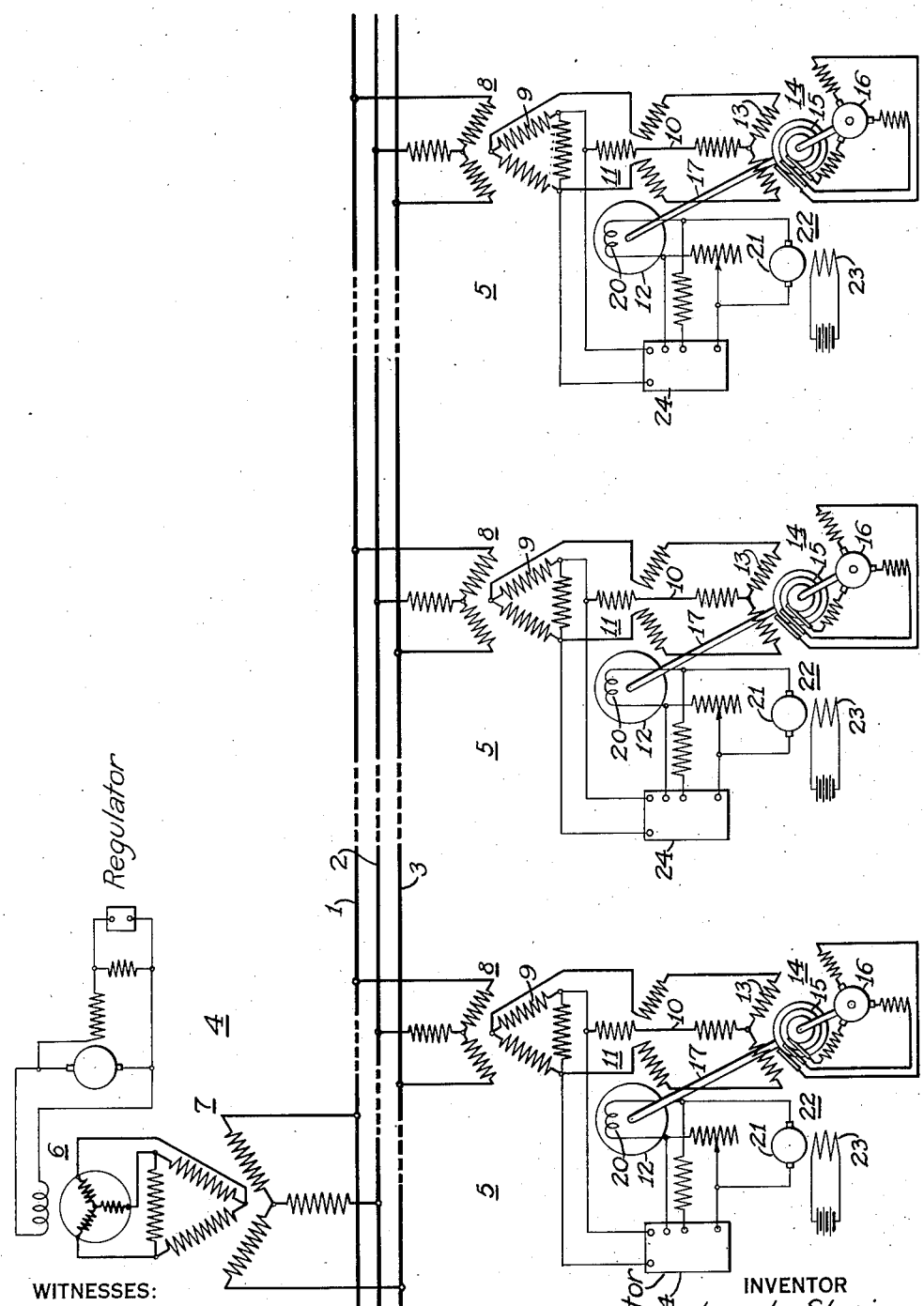
WITNESSES:
G. S. Neilson
W. R. Coley
INVENTOR
Joseph Slepian
BY
[signature]
ATTORNEY Patented Oct. 18, 1927.

1,645,937

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSMISSION SYSTEM.

Application filed March 17, 1924. Serial No. 699,655.

My invention relates to electrical power transmission lines or systems and particularly to those for the transmission of power at high voltages over long distances.

In a copending application of Frank G. Baum, Serial No. 569,704, filed June 20, 1922, patented February 8, 1927, No. 1,617,007, is shown a system that is particularly adapted to the high-voltage long-distance transmission of electrical power, this system embodying a plurality of synchronous condensers spaced along the line and adapted to provide the wattless current required in each section of the line between condenser stations, whereby a substantially constant voltage may be maintained throughout a relatively long-transmission line.

The synchronous reactance of such condensers, which thus act as an integral part of the transmission line proper, tends to reduce the total load capacity of the transmission system, or, in other words, tends to produce instability in the operation of the system when certain limiting load values are approached.

It is one object of my present invention, therefore, to increase the stability of a system of the character outlined by compensating for, or materially reducing, the synchronous reactance of the condensers in such manner that the total load capacity or stability of the system as a whole is increased.

More specifically stated, it is the object of my invention to provide synchronous condensers that are employed in a system of the above-indicated character with means for supplying leading currents to the phase windings of the condensers to inherently compensate for or materially reduce the synchronous reactance of the condensers. The necessary apparatus may take the form of an asynchronous motor, the primary phase windings of which are connected in series relation with the phase windings of the corresponding synchronous condenser, the secondary winding of the asynchronous motor being connected to a suitable phase advancer.

My invention may best be understood by reference to the accompanying drawing, wherein the single figure is a diagrammatic view of a transmission and distribution system organized in accordance with my present invention.

Referring to the drawing, the system here shown comprises a plurality of transmission lines or conductors 1, 2 and 3 constituting a three-phase high-voltage circuit to which one or more sources of energy, such as generating stations 4, are connected, while a plurality of synchronous condenser substations 5 are also connected at spaced points along the line remote from the generating station or stations. The generating stations 4 may be of any suitable steam or hydraulically-driven type, comprising an alternating-current generator 6 that is connected to the transmission line conductors 1, 2 and 3 through a suitable step-up transformer 7. The generator 6 is regulated for constant voltage, as indicated.

Each of the synchronous condenser substations 5 comprises a suitable step-down transformer 8, the secondary winding 9 of which is connectetd to the primary or stator winding 10 of a synchronous condenser 11, having a rotor 12. The respective phase windings 10 of the condenser are connected in series relation with the star-connected primary phase windings 13 of an asychronous or induction motor 14, having a wound rotor 15, the respective slip rings of which are connected to the terminals of a phase advancer 16 of any suitable type, such as the well-known Kapp or Leblanc machines. The rotor 12 of the synchronous condenser may be mechanically connected, as by a shaft 17, to the rotor 15 of the asynchronous motor and the rotor of the phase advancer 16, or the induction motor 14 may be independently driven.

The rotor 12 is provided with a suitable direct-current exciting or field winding 20, which is energized from the armature 21 of an exciter 22 having a suitably energized field winding 23. It will be understood that the excitation circuit of the synchronous condenser may be of any suitable type and preferably a regulator 24 is adapted to automatically govern the excitation of the synchronous condenser field winding 20 in such manner as to maintain a substantially constant voltage upon the transmission line at the corresponding substation.

The particular type of regulator to be employed is not relevant to the present invention and any suitable regulator for automatically over-exciting and under-exciting the field winding 13 as desired, may be employed. As examples of such regulators, reference may be had to Tirrill Patent No. 1,192,708, which was granted July 25, 1916 and to a copending application of H. A. Travers, regulator systems, Serial No. 540,178, filed March 1, 1922 and assigned to the Westinghouse Electric & Manufacturing Company.

By employing the machines and connections illustrated in each condenser substation, the synchronous reactance of the condenser 11 may be substantially compensated for, or materially reduced by reason of the leading currents that are introduced into the phase windings of the condenser by means of the phase advancer 16 being connected through the windings of the asynchronous motor 14. In this way, the effect of the synchronous reactance in reducing the total load capacity of the transmission system or reducing the stability of operation thereof, by preventing the transmission of certain limiting loads, is nullified or materially decreased, and a more efficient, and otherwise desirable transmission system, is obtained.

The number of poles employed in the asynchronous motor differs slightly from the number utilized in the synchronous condenser, for example, in the ratio of 12 to 10, in order to produce a desirably low frequency in the phase advancer 16. It will be understood that the ampere-turns of the field windings of the phase advancer and the position of the brushes on the commutator thereof are such as to produce the necessary leading currents in the asynchronous motor 14, whereby the desired action upon the energization of the synchronous condenser phase windings 10 is obtained.

The phase advancer 16 is adjusted by test, under wide fluctuations of current, in such manner that a minimum adjustment of excitation by the exciter 22 will be necessary. In other words, a large part of the usual regulating effect of the vibratory regulator 24 is transferred to the inherently acting phase-advancer which, in contradistinction to such vibratory regulators, may be termed "inherently responsive means", by which term it is meant that no externally produced changes in the circuits of the means in question are necessary to produce the desired regulation. For example, if the voltage of the synchronous condenser phase windings 10 is decreased, then the inherent action of the phase advancer causes an increased voltage to be developed in the stator windings thereof. In this connection, it should be borne in mind that the regulator 24 is adapted to function to produce constant voltage with respect to the entire aggregate of machines—that is, the aggregate including machines 11, 14 and 16; in other words, constant voltage is maintained at the transformer terminals and on the transmission line and not at the terminals of any one machine of the aggregate.

The capacity or size of the asynchronous motor 14 and of the phase advancer 16 will, of course, be materially less than that of the synchronous condenser. In this way, the advantages to be derived from the use of my system are not overbalanced by the expense of construction and maintenance of additional machines. "Synchronous reactance" may be defined as a fictitious quantity composed of the actual leakage reactance of the armature plus a component corresponding to the armature reaction. The voltage drop caused by the synchronous reactance may be termed the "synchronous reactance volts". On the other hand, the "total volts" developed by the synchronous condenser, together with the current required, determines the necessary size or capacity of the condenser. The phase-advancer 16 compensates for the synchronous reactance volts only. For example, if the ratio of the synchronous reactance volts of the condenser to the total volts is on the order of 50%, then the size or capacity of the asynchronous motor 14 will be substantially 50% of the size or capacity of the synchronous condenser. Likewise, the size of the phase advancer 16 depends upon the ratio of the frequencies corresponding to the synchronous condenser and the asynchronous motor. For instance, if the synchronous condenser has 10 poles and the asynchronous motor 12, then the relative slip frequency is 20% and the capacity or size of the phase advancer should, in this case, be approximately 20% of the size of the asynchronous motor.

It will be seen that, by the use of my invention, a material increase in the stability of a transmission system may be secured since, if the synchronous reactance of the condenser is reduced by 90%, for example, then the increase of load that may be safely and stably transmitted through the system will be increased above the former stable limit, corresponding to the total synchronous reactance, in a corresponding proportion.

Furthermore, the operation of the apparatus is practically instantaneous because of the inherent action of the various interconnected machines. All necessary changes in the regulation of the currents traversing the phase windings of the condenser take place in the course of one or two cycles, whereas by the use of a Tirrill or other type of regulator alone, materially more time is necessary to effect the desired regulation by reason of the unavoidable sluggish action of the condenser field winding.

It will be understood that various other combinations of apparatus employing, for example, static condensers, may be utilized in following out the principles of my invention and without departing from the spirit and scope thereof. I desire, therefore, that only such limitations shall be imposed as are indicated in the appended claims.

I claim as my invention:

1. A system of power transmission comprising a transmission line, a source of energy connected thereto, a synchronous condenser connected to the line at a point remote from said source, and inherently responsive means for compensating for the synchronous reactance of said condenser to increase the stability of the system.

2. A system of power transmission comprising a transmission line, a source of energy connected thereto, a synchronous condenser connected to the line at a point remote from said source, and means connected in series relation with the phase windings of said condenser to materially reduce the synchronous reactance thereof.

3. A system of power transmission comprising a transmission line, a source of energy connected thereto, a synchronous condenser connected to the line at a point remote from said source, and means including a phase-advancer machine associated with the phase windings of said condenser to materially decrease the synchronous reactance of the condenser.

4. A system of power transmission comprising a transmission line, a source of energy connected thereto, a synchronous condenser connected to the line at a point remote from said source, an asynchronous machine having its primary windings connected to the phase windings of said condenser, and a phase-advancer machine connected to the secondary windings of said asynchronous machine.

5. A system of power transmission comprising a transmission line, a source of energy connected thereto, a synchronous condenser connected to the line at a point remote from said source, an asynchronous machine having its primary windings connected in series relation with the phase windings of said condenser, and a phase advancer connected to the secondary windings of said asynchronous machine.

6. The combination with a transmission line requiring variable reactive currents for maintaining substantially constant voltage, of a main dynamo-electric machine connected to said line for maintaining said voltage, and an auxiliary dynamo-electric machine inherently operable to develop a substantially 90° leading electromotive force proportional to the currents flowing therethrough, said auxiliary machine being so connected in series circuit relation to a winding of said main machine as to overcome some of the reactance encountered by the currents flowing through said machine for maintaining said voltage.

7. The combination with a dynamo-electric machine adapted to maintain substantially constant voltage at some point in a circuit connected to its terminals, of means inherently operable to develop a substantially 90° leading electromotive force proportional to the currents flowing therethrough, said means being so connected in series circuit relation to a winding of said machine as to overcome some of the reactive drops encountered by the currents flowing between said machine and said point in said circuit whereby some of the variations in line voltage incident to changes in currents are prevented.

8. The combination with a synchronous dynamo-electric machine adapted to supply variable currents and to maintain a substantially constant voltage, of means inherently operable to develop a substantialy 90° leading electromotive force proportional to the currents flowing therethrough, said means being so connected in series circuit relation to a winding of said machine as to overcome a substantial part, less than all, of the synchronous reactance of said machine, variable excitation means associated with said machine, and voltage-responsive regulating means for changing the excitation to compensate for the remainder of said synchronous reactance and to maintain substantially constant voltage conditions.

9. The combination with a synchronous dynamo-electric machine having relatively rotating parts carrying an armature winding and an exciting winding, respectively, of means inherently operable to develop a substantially 90° leading electromotive force proportional to the currents flowing therethrough, said means being serially connected to said armature winding and developing an electromotive force that is a substantial part of, and opposite to, the synchronous reactance of said machine.

10. The combination with a synchronous dynamo-electric machine having relatively rotating parts carrying an armature winding and an exciting winding, respectively, of an induction machine driven at a speed other than synchronism and having primary and secondary windings, said primary winding being serially connected in circuit with said armature winding, and a phase advancer associated with said secondary winding and introducing such electromotive forces as to cause said induction machine to compensate for a substantial part of the synchronous reactance of said synchronous machine.

In testimony whereof, I have hereunto subscribed my name this 10th day of March, 1924.

JOSEPH SLEPIAN.